(12) United States Patent
Katai et al.

(10) Patent No.: US 8,470,473 B2
(45) Date of Patent: Jun. 25, 2013

(54) ELECTRODE AND ELECTROCHEMICAL DEVICE

(75) Inventors: Kazuo Katai, Tokyo (JP); Yousuke Miyaki, Tokyo (JP); Kiyonori Hinoki, Tokyo (JP); Tadashi Suzuki, Tokyo (JP)

(73) Assignee: TDK Corporation, Tokyo (JP)

( * ) Notice: Subject to any disclaimer, the term of this patent is extended or adjusted under 35 U.S.C. 154(b) by 1086 days.

(21) Appl. No.: 12/055,681

(22) Filed: Mar. 26, 2008

(65) Prior Publication Data
US 2008/0311476 A1 Dec. 18, 2008

(30) Foreign Application Priority Data
Mar. 30, 2007 (JP) ................. P2007-092770

(51) Int. Cl.
*H01M 4/02* (2006.01)
*H01M 4/62* (2006.01)

(52) U.S. Cl.
USPC ......... 429/209; 429/232; 429/233; 429/218.1

(58) Field of Classification Search
USPC ................................ 429/209–246
See application file for complete search history.

(56) References Cited

U.S. PATENT DOCUMENTS

| 6,517,973 | B1 * | 2/2003 | Tomita et al. | 429/231.4 |
| 6,905,796 | B2 * | 6/2005 | Ishida et al. | 429/209 |
| 2005/0204527 | A1 * | 9/2005 | Hinoki et al. | 29/25.42 |
| 2008/0020271 | A1 * | 1/2008 | Sato et al. | 429/129 |

FOREIGN PATENT DOCUMENTS

| JP | A-9-283180 | 10/1997 |
| JP | A-2001-110454 | 4/2001 |

OTHER PUBLICATIONS

Translation of Japanese Patent Application 09-283180.*
Japanese Office Action for Patent Application No. 2007-092770 dated Aug. 18, 2009.

* cited by examiner

*Primary Examiner* — Raymond Alejandro
*Assistant Examiner* — Helen McDermott
(74) *Attorney, Agent, or Firm* — Oliff & Berridge, PLC

(57) ABSTRACT

An electrode has a current collector, and an active material-containing layer provided on the current collector and containing active material particles and ceramic particles, and a weight concentration of the ceramic particles to the active material particles in a surface part in the active material-containing layer on the opposite side to the current collector is higher than a weight concentration of the ceramic particles to the active material particles in a lower part in the active material-containing layer on the current collector side. Furthermore, the thickness of the surface part is not less than 30% nor more than 60% of the total thickness of the surface part and the lower part.

16 Claims, 4 Drawing Sheets

Fig. 4

| | Surface part of active material layer | | | | | | Lower part of active material layer | Ts/(Ts+Tu) | Overcharge Test A (1.95A-4.6V:CCCV) | | Overcharge Test B (1A-5V:CCCV) | |
|---|---|---|---|---|---|---|---|---|---|---|---|---|
| | Ceramic particles | Particle size of ceramic particles Rc [μm] | Active material particles | Particle size of active material Ra [μm] | Content of ceramic particles to 100 parts by weight of active material particles (parts by weight) | Thickness of surface part Ts [μm] | Thickness of lower part Tu [μm] | | Final charge capacity [mAh] | Max arrival temperature [°C] | Final charge capacity [mAh] | Max arrival temperature [°C] |
| EXAMPLE 1 | ALUMINA | 12 | GRAPHITE | 24 | 5 | 33 | 68 | 0.33 | 782 | 38.2 | 1106 | 36.5 |
| EXAMPLE 2 | ALUMINA | 12 | GRAPHITE | 24 | 13 | 33 | 68 | 0.33 | 774 | 36.7 | 1073 | 33 |
| EXAMPLE 3 | ALUMINA | 12 | GRAPHITE | 24 | 25 | 33 | 68 | 0.33 | 683 | 35.4 | 998 | 32.7 |
| EXAMPLE 4 | ALUMINA | 12 | GRAPHITE | 24 | 53 | 33 | 68 | 0.33 | 615 | 32.3 | 945 | 30.5 |
| EXAMPLE 5 | ALUMINA | 12 | GRAPHITE | 24 | 72 | 33 | 68 | 0.33 | 603 | 30.8 | 923 | 29.8 |
| EXAMPLE 6 | ALUMINA | 12 | GRAPHITE | 24 | 83 | 33 | 68 | 0.33 | 593 | 28.3 | 860 | 25.6 |
| EXAMPLE 7 | ALUMINA | 12 | GRAPHITE | 24 | 13 | 42 | 68 | 0.38 | 632 | 32.7 | 962 | 30.1 |
| EXAMPLE 8 | ALUMINA | 12 | GRAPHITE | 24 | 13 | 56 | 68 | 0.45 | 619 | 31.8 | 952 | 29.8 |
| EXAMPLE 9 | ALUMINA | 12 | GRAPHITE | 24 | 13 | 64 | 68 | 0.48 | 442 | 26.3 | 722 | 30.6 |
| COMPARATIVE EXAMPLE 1 | ALUMINA | 12 | GRAPHITE | 24 | 13 | 100 | - | - | 421 | 26.9 | 703 | 31.3 |
| COMPARATIVE EXAMPLE 2 | - | - | GRAPHITE | 24 | - | - | 100 | - | 1305 | 92.1 | UNMEASURABLE | UNMEASURABLE |
| COMPARATIVE EXAMPLE 3 | ALUMINA | 12 | GRAPHITE | 24 | 13 | 24 | 68 | 0.26 | 1208 | 88.8 | UNMEASURABLE | UNMEASURABLE |
| EXAMPLE 10 | ALUMINA | 2.1 | GRAPHITE | 24 | 13 | 33 | 68 | 0.33 | 492 | 29.3 | 809 | 25.6 |
| EXAMPLE 11 | ALUMINA | 2.7 | GRAPHITE | 24 | 13 | 33 | 68 | 0.33 | 511 | 32.7 | 952 | 27.3 |
| EXAMPLE 12 | ALUMINA | 15 | GRAPHITE | 24 | 13 | 33 | 68 | 0.33 | 780 | 37.5 | 1090 | 34.2 |
| EXAMPLE 13 | ALUMINA | 20 | GRAPHITE | 24 | 13 | 33 | 68 | 0.33 | 788 | 38.6 | 1089 | 36.3 |
| EXAMPLE 14 | ALUMINA | 24 | GRAPHITE | 24 | 13 | 33 | 68 | 0.33 | 806 | 39.8 | 1092 | 37.1 |
| EXAMPLE 15 | ALUMINA | 28 | GRAPHITE | 24 | 13 | 33 | 68 | 0.33 | 812 | 45.3 | 1095 | 42.5 |
| EXAMPLE 16 | SILICA | 12.5 | GRAPHITE | 24 | 13 | 33 | 68 | 0.33 | 768 | 37.3 | 1056 | 32.3 |
| EXAMPLE 17 | ZIRCONIA | 14 | GRAPHITE | 24 | 13 | 33 | 68 | 0.33 | 769 | 38.9 | 1065 | 35.6 |

ELECTRODE AND ELECTROCHEMICAL DEVICE

BACKGROUND OF THE INVENTION

1. Field of the Invention

The present invention relates to an electrode and an electrochemical device.

2. Related Background Art

A known electrode for an electrochemical device such as a lithium secondary battery has a structure in which an active material-containing layer is provided on a current collector. This electrode is produced by applying a paste containing active material particles, a binder, a conductive aid, and a solvent, onto the current collector, drying it to evaporate the solvent, and thereafter pressing a coating film. A purpose of this press is to enhance the volume energy density of the electrode (see, for example, Japanese Patent Application Laid-open No. 2001-110454).

SUMMARY OF INVENTION

Incidentally, the batteries are required to have sufficient safety during overcharging in recent years. With the conventional electrodes, the battery can be heated up to considerably high temperature during overcharging. The inventors conducted elaborate research and found that it was partly because, as shown in FIG. 2, active material particles 5, particularly, in a surface part 14b in an active material-containing layer 14 were flattened by the press to close most of the void in the surface part 14b of the active material-containing layer 14. It is considered that when most of the void in the surface part 14b of the active material-containing layer 14 is closed, an electrolyte solution tends to stay on the surface of the surface part 14b in the active material-containing layer 14, so as to promote formation and growth of dendrites of metal ions on the surface of the active material-containing layer 14, particularly, during overcharging, and the dendrites unfavorably induce generation of heat due to minute short circuits to a counter electrode.

Then the inventors considered that the void in the active material layer should be maintained by mixing ceramic particles or the like resistant to crush during the press, into the active material layer, but simple mixing thereof raises concern of reduction in capacity.

The present invention has been accomplished in view of the above-discussed circumstances and an object of the invention is to provide an electrode capable of suppressing generation of heat during overcharging and achieving a sufficient capacity, and an electrochemical device using the electrode.

An electrode according to the present invention comprises a current collector; and an active material-containing layer provided on the current collector and containing active material particles and ceramic particles. A weight concentration of the ceramic particles to the active material particles in a surface part in the active material-containing layer on the opposite side to the current collector is higher than a weight concentration of the ceramic particles to the active material particles in a lower part in the active material-containing layer on the current collector side, and a thickness of the surface part is not less than 30% nor more than 60% of a total thickness of the surface part and the lower part.

In this configuration, the surface part, in which the void is readily closed by crush of the active material particles, contains the high concentration of ceramic particles, and thus the ceramic particles are interposed among the active material particles to suppress the crush of the void in the surface part.

On the other hand, the ceramic concentration is relatively low in the lower part which is so far from the surface as not to raise the problem of crush of the void and which does not have to contain the ceramic particles accordingly; therefore, the capacity is not wastefully lowered. Particularly, the concentration in the surface part is appropriately set, which achieves maintenance of the capacity and resistance to crush of the void in the surface part together to a high degree.

The percentage of the thickness of the surface part is preferably not less than 30% nor more than 60% as a percentage of the thickness of the active material layer containing the ceramic particles in the total coating film. A problem will arise if the part of this thickness is flattened under an ordinary press condition; when the percentage is set in the foregoing range, the effect of the present invention is adequately achieved.

The surface part preferably contains not less than 5 parts by weight nor more than 85 parts by weight of the ceramic particles and more preferably not less than 10 parts by weight nor more than 80 parts by weight of the ceramic particles, relative to 100 parts by weight of the active material particles. When the concentration is set in his range, the disappearance of the void is efficiently suppressed in particular. If the concentration of ceramic particles in the surface part is too high, the capacity will be lowered to the contrary. There are no particular restrictions on the concentration of ceramic particles in the lower part, and since little trouble is made by closure of the void due to flattening of the active material particles by the press in the lower part, the weight concentration of the ceramic particles in the lower part is preferably not more than one fifth, more preferably not more than one tenth, and still more preferably not more than one twentieth of the weight concentration in the surface part, in order to reduce the weight concentration of ceramic particles not contributing to occlusion and release of electrolyte ions such as lithium ions.

In the surface part, where an average particle size of the active material particles is defined as 1, an average particle size of the ceramic particles is preferably not less than 0.08 nor more than 1.0. This allows the void to be sufficiently left in the surface part during the press.

The active material particles are preferably carbon particles. Since the carbon particles, particularly graphite particles, are soft and easily crushed during the press, the effect of the present invention is particularly outstanding.

The ceramic particles are preferably particles of at least one kind selected from the group consisting of alumina particles, silica particles, zirconia particles, titan particles, magnesia particles, silicon carbide particles, tungsten carbide particles, silicon nitride particles, and boron nitride particles. Since these particles are hard and stable, they are suitable for the present invention.

A battery according to the present invention is an electrochemical device comprising the above-described electrode.

The present invention provides the electrode capable of suppressing the generation of heat during overcharging and achieving a sufficient capacity, and the electrochemical device using the electrode.

BRIEF DESCRIPTION OF THE DRAWINGS

FIG. 4 is a table showing the conditions and results in examples and comparative examples.

DESCRIPTION OF THE PREFERRED EMBODIMENTS

Figure 1:
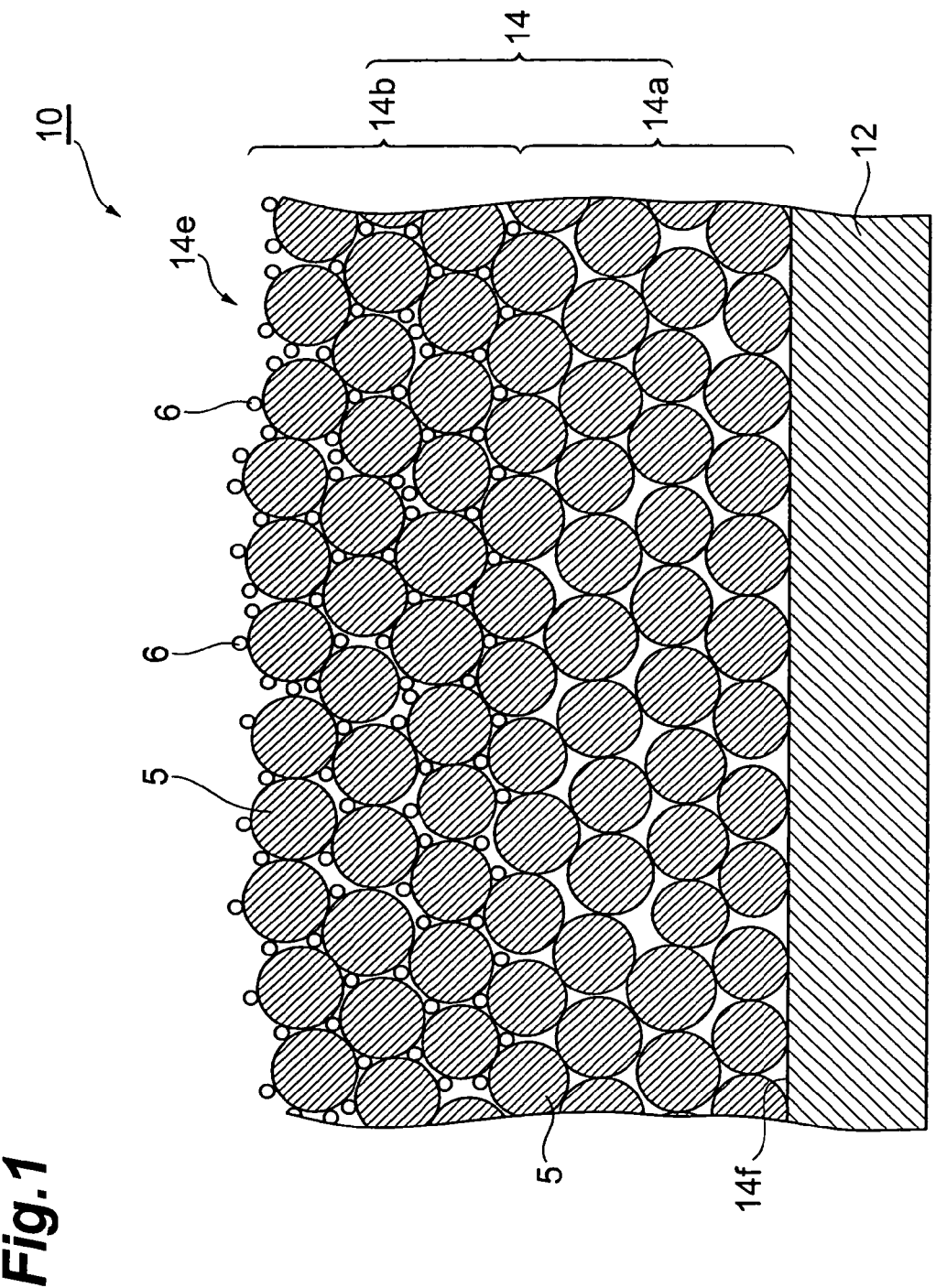
FIG. 1 is a schematic sectional view of an electrode according to an embodiment of the present invention.
Figure 2:
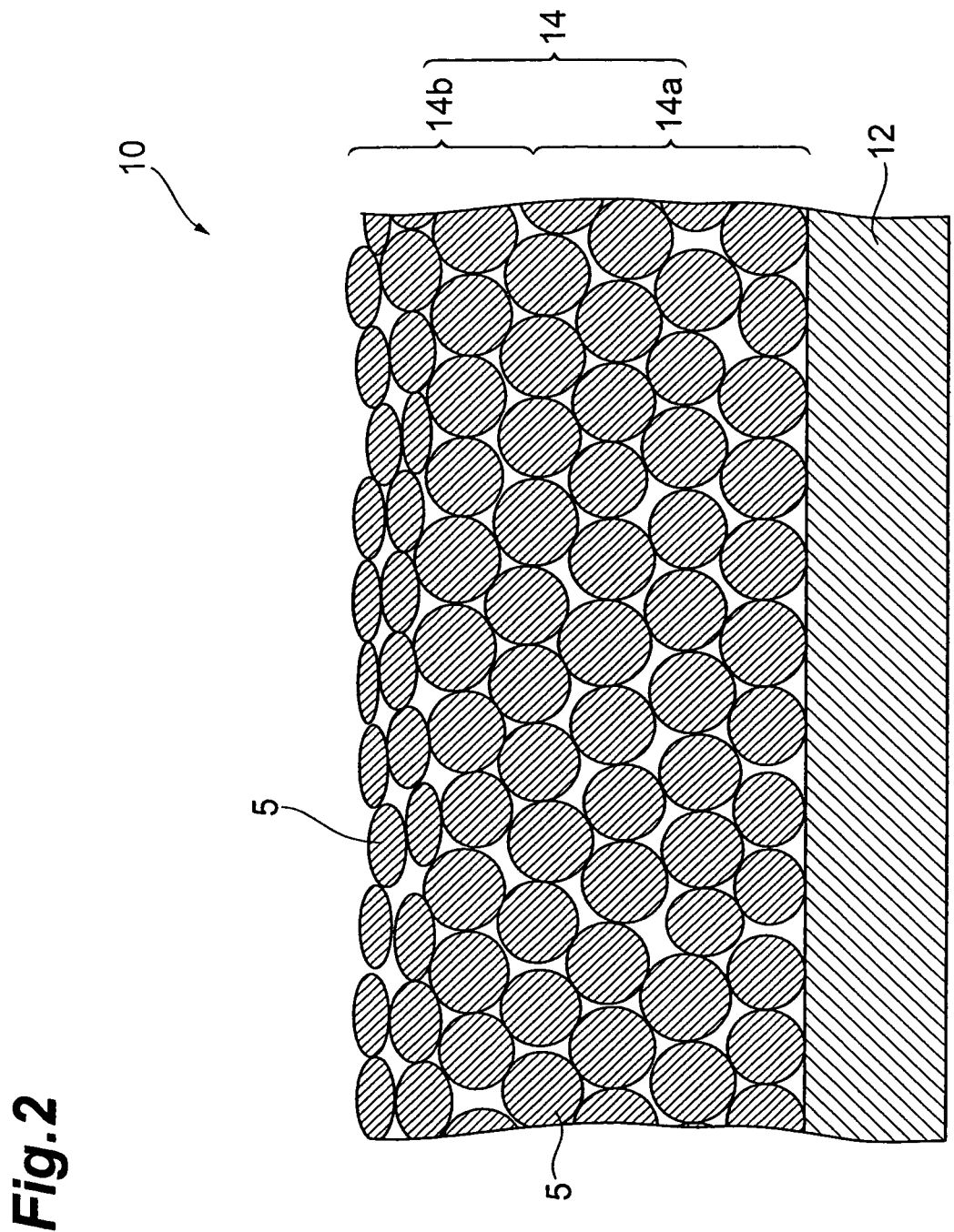
FIG. 2 is a schematic sectional view of a conventional electrode.

The preferred embodiments of the present invention will be described below in detail with reference to the accompanying drawings. Identical or equivalent elements will be denoted by the same reference symbols in the description of the drawings, without redundant description. The dimensional ratios in the drawings do not always agree with actual dimensional ratios.

(Electrode)

First, an electrode according to an embodiment of the present invention will be described with reference to FIG. 1. The electrode 10 has a structure in which an active material-containing layer 14 is provided on a current collector 12.

The current collector 12 can be, for example, an aluminum foil (suitable particularly for a cathode), a copper foil (suitable particularly for an anode), a nickel foil, or the like.

The active material-containing layer 14 is a layer containing active material particles 5, ceramic particles 6, a binder (not shown), and a conductive aid (not shown) added according to need.

Examples of anode active material particles include carbon particles such as particles of graphite, non-graphitizing carbon, graphitizing carbon, and carbon burned at a low temperature capable of occluding and releasing (intercalating and deintercalating, or doping and dedoping with) lithium ions, composite material particles of carbon and metal, particles of metals such as Al, Si, and Sn capable of combining with lithium, and particles containing lithium titanate ($Li_4Ti_5O_{12}$) or the like. Particularly, the carbon particles are especially suitable for the present invention because they are so soft as to be extremely easily crushed in an after-described surface part 14b during press.

Examples of cathode active material particles include lithium oxides containing at least one metal selected from the group consisting of Co, Ni and Mn, such as $LiMO_2$ (where M is Co, Ni, or Mn), $LiCo_xNi_{1-x}O_2$, $LiMn_2O_4$, and $LiCo_xNi_yMn_{1-x-y}O_2$ (where each of x and y is more than 0 and less than 1), and, particularly, $LiCo_xNi_yMn_{1-x-y}O_2$ is more preferably applicable.

There are no particular restrictions on the average particle size, min and max values in a particle size distribution, etc. of these active material particles, but the average particle size can be normally, for example, not less than 1 μm nor more than 30 μm. The average particle size can be defined, for example, as D50 which is a 50% diameter in a volume-based particle size distribution. The particle size distribution can be readily acquired by the laser diffraction-scattering method or the like.

There axe no particular restrictions on the binder as long as it can bind the aforementioned active material particles and conductive aid to the current collector. The binder can be one of the well-known binders. The binder can be, for example, one selected from fluorocarbon polymers such as polyvinylidene fluoride (PVDF) and polytetrafluoroethylene (PTFE), mixtures of styrene-butadiene rubber (SBR) and a water-soluble polymer (carboxymethyl cellulose, polyvinyl alcohol, sodium polyacrylate, dextrin, gluten, or the like), and so on.

The conductive aid can be, for example, one selected from carbon blacks, carbon materials, fine powders of metals such as copper, nickel, stainless steel, and iron, mixtures of the carbon materials and metal fine powders, and electrically conductive oxides such as ITO.

In the present embodiment, the active material-containing layer 14 has a surface part 14b including a surface 14e on the opposite side to the current collector 12, and a lower part 14a including a surface 14f nearer to the current collector 12. A weight concentration of ceramic particles 6 to active material particles 5 in the surface part 14b is higher than a weight concentration of ceramic particles 6 to active material particles 5 in the lower part 14a. Namely, the ceramic particles 6 are interposed in the high concentration among the active material particles 5 in the surface part 14b. Therefore, excessive closure of the void is suppressed in the surface part 14b.

The thickness of this surface part 14b is not less than 30% nor more than 60% of the total thickness of the surface part 14b and the lower part 14a. When flattening is controlled in this level of thickness, little trouble is made by generation of heat or the like during overcharging. If the surface part 14b is too thick, the capacity can be needlessly lowered in some cases.

The surface part 14b preferably contains not less than 5 parts by weight nor more than 85 parts by weight of ceramic particles 6 and more preferably not less than 10 parts by weight nor more than 80 parts by weight of ceramic particles 6, relative to 100 parts by weight of active material particles 5. If the concentration of ceramic particles 6 is too high, the capacity tends to be lowered; if it is too low, the effect of suppressing the closure of the void tends to degrade.

Examples of the ceramic particles 6 include high-hardness inorganic particles e.g., particles of $Al_2O_3$, $SiO_2$, $TiO_2$, $ZrO_2$, $Si_3N_4$, BN, WC, MgO, and so on.

There are no particular restrictions on the average particle size of the ceramic particles 6, but, particularly, in the surface part 14b, where the average particle size of active material particles 5 is defined as 1, the average particle size of ceramic particles 6 is preferably not less than 0.08 nor more than 1.0. This allows the ceramic particles 6 to be efficiently located among the active material particles 5, thereby effectively exercising the effect of tile present invention. More specifically, the average particle size of the ceramic particles 6 can be, for example, not less than 2 μm nor more than 30 μm.

There are no particular restrictions on the weight concentration of ceramic particles 6 in the lower part 14a as long as it is lower than that in the surface part 14b. Since little trouble is made by closure of the void due to flattening of the active material particles 5 by the press in the lower part 14a, the weight concentration of ceramic particles 6 is preferably not more than one fifth, more preferably not more than one tenth, and still more preferably not more than one twentieth of the weight concentration in the surface part 14b, and is ideally zero, in order to reduce the weight concentration of ceramic particles 6 not contributing to occlusion and release of electrolyte ions such as lithium ions.

It is preferable to use the active material particles with the same average particle size and of the same material for the lower part 14a and the surface part 14b, but the present invention can also be carried out with use of active material particles with different average particle sizes or with use of active material particles of different materials.

(Production Method of Electrode)

This electrode can be produced as follows. The active material particles 5, the binder, a necessary amount of the conductive aid, and a necessary amount of the ceramic particles 6 are added in a solvent such as N-methyl-2-pyrrolidone or N,N-dimethylformamide to obtain a slurry, and the slurry is applied onto the surface of the current collector 12, and is then dried. This step is repeated twice. In this process, the concentration of the ceramic particles 6 to the active material particles 5 in the slurry applied for formation of the lower part 14a is made lower than the concentration of the ceramic particles 6 to the active material particles 5 in the slurry applied thereafter for formation of the surface part 14b. Thereafter, the electrode is pressed with a press machine of roll press or the like. The linear pressure during the press can be, for example, 200-2000 kgf/cm. The press step may be carried out by a method of first pressing only the lower part 14a singly after formation thereof, then forming the surface part 14b, and thereafter pressing the surface part 14b, or by a method of forming the surface part 14b on the lower part 14a and thereafter pressing the two layers at the same time. The linear pressures on the lower part 14a and on the surface part 14b during the press may be identical to or different from each other. For example, after formation of the lower part 14a, the lower part 14a is pressed under the linear pressure of about 500 kgf/cm, the surface part 14b is then formed, and the surface part 14b is pressed under the linear pressure of about 1000 kgf/cm. In another method, after formation of the lower part 14a, the surface part 14b is formed and thereafter the two layers are simultaneously pressed under the linear pressure of about 1000 kgf/cm.

(Action And Effect)

In the present embodiment, the ceramic particles 6 exist among the active material particles 5 in the surface part 14b including the surface 14e on the opposite side to the current collector 12 in the active material-containing layer 14. Since the ceramic particles 6 have high hardness and are relatively unlikely to be crushed, they are interposed among the active material particles 5 to secure the clearance enough for the electrolyte solution to penetrate and diffuse. Therefore, when the surface layer is subjected to the press, the closure of the void due to excessive flattening of the active material particles 5 is suppressed in the surface part 14b. Therefore, it becomes feasible to suppress the deposition of dendrites and also to suppress the generation of heat during overcharging.

On the other hand, the concentration of ceramic particles 6 in the lower part 14a including the surface 14f nearer to the current collector 12 is smaller than that in the surface part 14b. Since the closure of the void during the press is little in the lower part 14a, mixing the ceramic particles therein is not necessarily needed and thus unprofitable volume and weight do not have to be spent, so as to adequately prevent reduction in the capacity of the electrode. Particularly, the present invention achieves the maintenance of capacity and the suppression of generation of heat together to a high degree because the thickness of the surface part 14b is appropriately set.

(Electrochemical Device)

Figure 3:
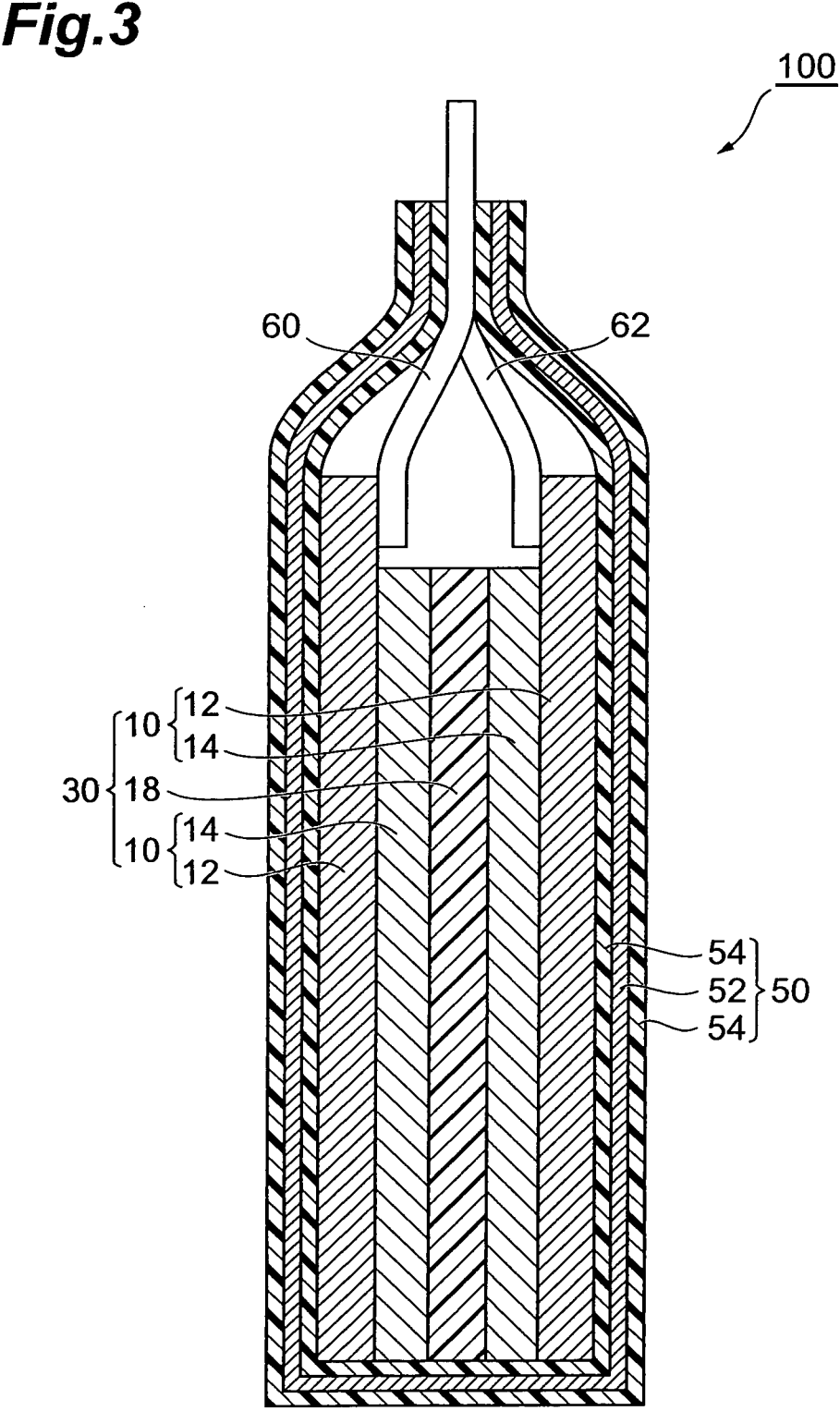
FIG. 3 is a schematic sectional view of a lithium-ion secondary battery according to an embodiment of the present invention.

Next, an example of an electrochemical device according to the present invention will be described. FIG. 3 shows an example of a lithium-ion secondary battery.

This lithium-ion secondary battery 100 is composed mainly of a laminate 30, a case 50 housing the laminate 30 in a hermetically closed state, and a pair of leads 60, 62 connected to the laminate 30.

The laminate 30 has a structure in which a pair of electrodes 10, 10 are opposed to each other with a separator 18 in between. Two active material-containing layers 14 are located on both sides of the separator 18 as they are kept in contact with the respective sides. The leads 60, 62 are connected to respective ends of current collectors 12 and the ends of the leads 60, 62 extend outward from the case 50. One electrode 10 serves as a positive electrode and the other electrode 10 as a negative electrode.

An electrolyte solution is contained inside each of the active material-containing layers 14 and the separator 18. There are no particular restrictions on the electrolyte solution, and in the present embodiment, the electrolyte solution can be, for example, an electrolyte solution (an aqueous electrolyte solution, or an electrolyte solution using an organic solvent) containing a lithium salt. However, the aqueous electrolyte solution has a low electrochemical decomposition voltage and thus the withstanding voltage in charging is limited to a low level; therefore, it is preferable to adopt an electrolyte solution using an organic solvent (i.e., a nonaqueous electrolyte solution). The electrolyte solution preferably used herein is a nonaqueous electrolyte solution in which a lithium salt is dissolved in a nonaqueous solvent (an organic solvent). The lithium salt used herein can be, for example, one of salts such as $LiPF_6$, $LiClO_4$, $LiBF_4$, $LiAsF_6$, $LiCF_3SO_3$, $LiCF_3CF_2SO_3$, $LiC(CF_3SO_2)_3$, $LiN(CF_3SO_2)_2$, $LiN(CF_3CF_2SO_2)_2$, $LiN(CF_3SO_2)(C_4F_9SO_2)$, $LiN(CF_3CF_2CO)_2$, and LiBOB. These salts may be used singly or in combination of two or more.

Examples of organic solvents preferably applicable herein include, for example, propylene carbonate, ethylene carbonate, diethylcarbonate, or the like. These may be used singly or as a mixture of two or more at any ratio.

In the present embodiment, the electrolyte solution does not always have to be the liquid electrolyte but may also be a gel electrolyte obtained by adding a gelatinizing agent in the solution. The electrolyte solution may also be replaced by a solid electrolyte (a solid polymer electrolyte or an electrolyte consisting of an ion-conductive inorganic material).

The separator 18 can also be any electrically insulating porous material and can be, for example, one of monolayer and multilayer bodies of film of polyethylene, polypropylene, or polyolefin, stretched films of mixtures of the foregoing polymers, or nonwoven fabric of fiber consisting of at least one constituent material selected from the group consisting of cellulose, polyester, and polypropylene.

The case 50 hermetically houses the laminate 30 and the electrolyte solution inside. There are no particular restrictions on the case 50 as long as it can suppress leakage of the electrolyte solution to the outside, and intrusion or the like of water and others from the outside to the interior of the lithium-ion secondary battery 100. For example, the case 50 can be a metal laminate film obtained by coating a metal foil 52 with polymer films 54 on both sides, as shown in FIG. 3. The metal foil 52 can be, for example, an aluminum foil and the polymer films 54 can be films of polypropylene or the like. For example, a material of the outside polymer film 54 is preferably a polymer with a high melting point, e.g., polyethylene terephthalate (PET) or polyamide, and a material of the inside polymer film 54 is preferably polyethylene, polypropylene, or the like.

The leads 60, 62 are made of an electrically conductive material such as aluminum.

It is also possible to adopt the structure of FIG. 1 for only one of the electrodes. For example, in the case of a lithium-ion secondary battery, only the negative electrode may be formed in the structure of FIG. 1, with sufficient effect.

The present invention is not limited to the above embodiments but can be modified in various ways. For example, the electrode according to the present invention is not applicable only to the lithium-ion secondary batteries, but is also applicable, for example, to electrodes of electrochemical capacitors. Particularly, the electrode of the present invention is especially suitable for electric double-layer capacities using a carbon material as the active material.

EXAMPLES

Example 1

A slurry was prepared by mixing a graphite powder (average particle size: 24 μm, 100 parts by weight) as active material particles, PVDF (10 parts by weight) as a binder, and acetylene black (5 parts by weight) as a conductive aid in N-methyl-2-pyrrolidone and the slurry was applied onto a copper foil (thickness: 20 μm) as an anode collector and dried to form the lower part 68 μm thick Thereafter, a slurry was prepared by mixing a graphite powder (average particle size: 24 μm, 100 parts by weight) as active material particles, an alumina powder (average particle size: 12 μm, 5 parts by weight) as ceramic particles, PVDF (8 parts by weight) as a binder, and acetylene black (5 parts by weight) as a conductive aid in N-methyl-2-pyrrolidone and the slurry was applied onto the lower part and dried to form the surface part 33 μm thick. Thereafter, the resultant was pressed under the linear pressure of 300 kgf/cm with hot rolls to produce an anode. The press was carried out by first pressing the lower layer film, thereafter applying the upper layer film, and again pressing it.

Examples 2-6

Electrodes of Examples 2-6 were produced in the same manner as in Example 1, except that the content of ceramic particles to 100 parts by weight of active material particles in the surface part was changed to 13, 25, 53, 72, or 83 parts by weight, respectively, in order.

Examples 7-9

Electrodes of Examples 7-9 were produced in the same manner as in Example 2, except that the thickness of the surface part was changed to 42, 56, or 64 μm, respectively, in order.

Comparative Example 1

An electrode of Comparative Example 1 was produced in the same manner as in Example 2, except that the lower part was not formed and the surface part was formed in the thickness of 100 μm.

Comparative Example 2

An electrode of Comparative Example 2 was produced in the same manner as in Example 2, except that the surface part was not formed and the lower part was formed in the thickness of 100 μm.

Comparative Example 3

An electrode of Comparative Example 3 was produced in the same manner as in Example 2, except that the thickness of the surface part was 24 μm.

Examples 10-15

Electrodes of Examples 10-15 were produced in the same manner as in Example 2, except that the average particle size of the ceramic particles was changed to 2.1, 2.7, 15, 20, 24, or 28 μm, respectively, in order.

Examples 16-17

Electrodes of Examples 16-17 were produced in the same manner as in Example 2, except that the ceramic particles were silica particles (average particle size: 12-5 μm) or zirconia particles (average particle size: 14 μm), respectively, in order.

[Measurement of Performance of Electrode]

A cathode was produced by forming an active material layer containing active material particles ($LiCoO_2$, 100 parts by weight), a binder (PVdF, 5 parts by weight), and a conductive aid (acetylene black, 6 parts by weight), on a current collector of aluminum, and a lithium-ion secondary battery was produced by using a polyolefin separator as a separator and an electrolyte solution containing $LiPF_6$.

An overcharge test A was conducted as follows: the battery was charged by constant-current charge at 1.95 A, thereafter constant-voltage charge was carried out after arrival at 4.6 V, and a final charge capacity and a maximum arrival temperature were measured A more demanding overcharge test B was conducted as follows: the battery was charged by constant-current charge at 1 A, then constant-voltage charge was carried out after arrival at 5 V, and a final charge capacity and a maximum arrival temperature were measured The results are shown in FIG. 4. The description of "unmeasurable" refers to the following: a large-scale short circuit occurred during the charge and the experiment was interrupted.

Comparative Example 1 showed a considerable reduction of capacity because of uniform dispersion of alumina throughout the entire active material layer and Comparative Example 2 showed likeliness of occurrence of a serious short circuit because of the extremely high maximum arrival temperature. The same also applies to Comparative Example 3. In contrast to them, each of the examples realized the sufficient capacity while keeping down the maximum arrival temperature.

What is claimed is:

1. An electrode comprising:
    a current collector; and
    an active material-containing layer provided on the current collector and containing active material particles and ceramic particles;
    wherein a weight concentration of the ceramic particles relative to the active material particles in a surface part in the active material-containing layer on the opposite side to the current collector is higher than a weight concentration of the ceramic particles relative to the active material particles in a lower part in the active material-containing layer on the current collector side, wherein the ceramic particles are uniformly distributed throughout the entirety of the surface part,
    wherein a thickness of the surface part is not less than 30% nor more than 60% of a total thickness of the surface part and the lower part, and
    wherein the surface part contains not less than 53 parts by weight nor more than 85 parts by weight of the ceramic particles relative to 100 parts by weight of the active material particles in the surface part.

2. The electrode according to claim 1, wherein in the surface part, where an average particle size of the active material particles is defined as 1, an average particle size of the ceramic particles is not less than 0.08 nor more than 1.0.

3. The electrode according to claim 1, wherein the active material particles are carbon particles.

4. The electrode according to claim 1, wherein the ceramic particles are at least one species selected from the group consisting of alumina particles, silica particles, zirconia particles, titania particles, magnesia particles, silicon carbide particles, tungsten carbide particles, silicon nitride particles, and boron nitride particles.

5. The electrode according to claim 1, wherein the lower part does not contain the ceramic particles.

6. An electrochemical device comprising the electrode as set forth in claim 1.

7. The electrode according to claim 1, wherein a weight concentration of the ceramic particles in the lower part is not more than one fifth of a weight concentration of the ceramic particles in the surface part.

8. The electrode according to claim 1, wherein the active material particles are cathode active material particles.

9. The electrode according to claim 1, wherein the surface part contains not less than 72 parts by weight nor more than 85 parts by weight of the ceramic particles relative to 100 parts by weight of the active material particles in the surface part.

10. An electrode comprising:
   a current collector; and
   an active material-containing layer provided on the current collector and containing active material particles and ceramic particles;
   wherein a weight concentration of the ceramic particles relative to the active material particles in a surface part in the active material-containing layer on the opposite side to the current collector is higher than a weight concentration of the ceramic particles relative to the active material particles in a lower part in the active material-containing layer on the current collector side, wherein the ceramic particles are uniformly distributed throughout the entirety of the surface part,
   wherein a thickness of the surface part is not less than 30% nor more than 60% of a total thickness of the surface part and the lower part,
   wherein the surface part contains not less than 25 parts by weight nor more than 85 parts by weight of the ceramic particles relative to 100 parts by weight of the active material particles in the surface part, and
   wherein the active material particles are cathode active material particles.

11. The electrode according to claim 10, wherein in the surface part, where an average particle size of the active material particles is defined as 1, an average particle size of the ceramic particles is not less than 0.08 nor more than 1.0.

12. The electrode according to claim 10, wherein the ceramic particles are at least one species selected from the group consisting of alumina particles, silica particles, zirconia particles, titania particles, magnesia particles, silicon carbide particles, tungsten carbide particles, silicon nitride particles, and boron nitride particles.

13. The electrode according to claim 10, wherein the lower part does not contain the ceramic particles.

14. An electrochemical device comprising the electrode as set forth in claim 12.

15. The electrode according to claim 10, wherein a weight concentration of the ceramic particles in the lower part is not more than one fifth of a weight concentration of the ceramic particles in the surface part.

16. The electrode according to claim 10, wherein the surface part contains not less than 72 parts by weight nor more than 85 parts by weight of the ceramic particles relative to 100 parts by weight of the active material particles in the surface part.

\* \* \* \* \*